April 2, 1968  F. DURRENMATT  3,376,076
WHEEL STRUCTURE WITH REVERSIBLE RIMS
Filed April 6, 1966
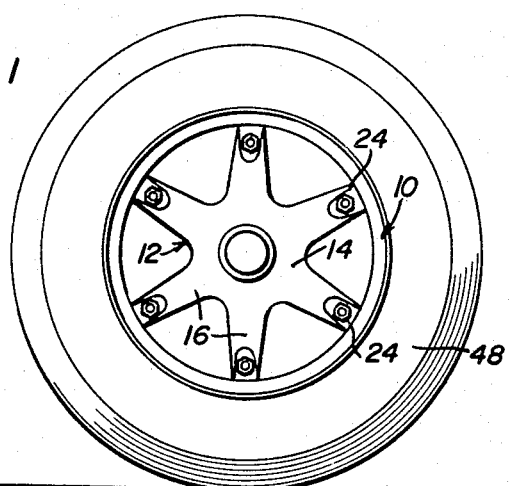
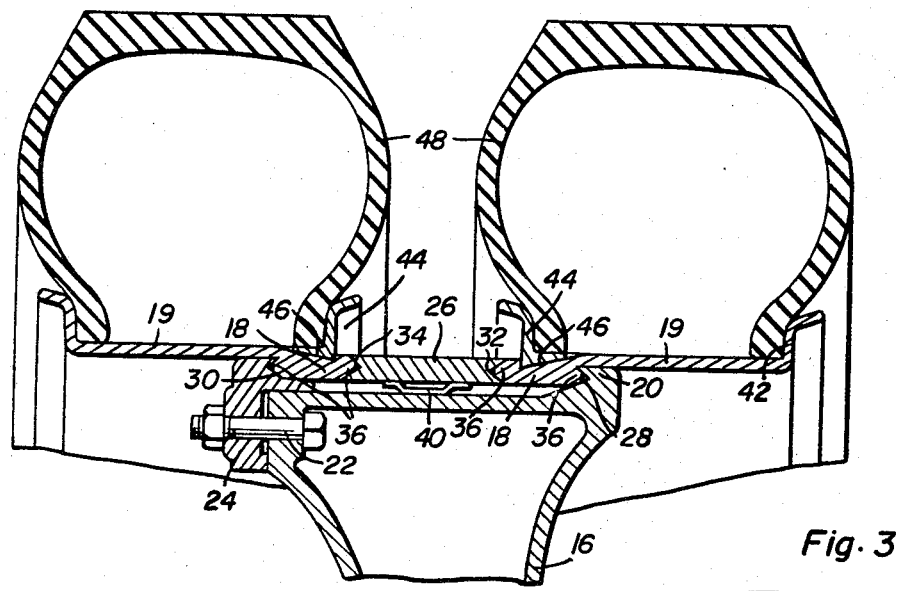
Fred Durrenmatt
INVENTOR.

United States Patent Office 3,376,076
Patented Apr. 2, 1968

3,376,076
WHEEL STRUCTURE WITH REVERSIBLE RIMS
Fred Durrenmatt, 1446 Burke Ave.,
St. Paul, Minn. 55113
Filed Apr. 6, 1966, Ser. No. 540,575
8 Claims. (Cl. 301—13)

ABSTRACT OF THE DISCLOSURE

A wheel body including opposite sides and circumferentially spaced pairs of opposing abutment means with one set of corresponding abutment means being removably supported from the wheel body and with outer rim means being provided and including means adapted to support tire casing means therefrom as well as inwardly projecting circumferentially spaced abutment means clampingly receivable between the corresponding pair of abutment means carried by the wheel body, the abutment means carried by the rim means including substantially identical oppositely axially facing abutment surfaces and the pairs of abutment means carried by the wheel body including substantially identical opposing abutment surface portions complementary to the abutment surface portions carried by the rim means whereby the latter may be readily reversed in position on the wheel body.

---

This invention relates to a novel and useful vehicle wheel construction and more specifically to a wheel construction of the type including a centrally disposed wheel body adapted to be rotatably journaled on an axle and provided with a removable and generally cylindrical outer rim portion with which a split lock rim and casing bead retaining flange may be removably associated for mounting a tire casing on the cylindrical outer rim portion.

The main object of this invention is to provide a wheel construction including the aforementioned central body portion and outer cylindrical rim portion and whose structural and operational features may be incorporated in the manufacture of single wheels as well as dual wheels.

Another important object of this invention is to provide a wheel construction of the type including removable generally cylindrical outer rim portions of the type set forth above and which may be constructed so as to be identical and yet interchangeable between a single wheel form as well as a dual wheel form of the instant invention.

A final object of this invention to be specifically enumerated herein is to provide a vehicle wheel construction in accordance with the preceding objects and which will conform to conventional forms of manufacture, be of simple construction and easy to assemble and disassemble so as to provide a device that will be economically feasible, long lasting and capable of being assembled and disassembled with conventional wrenches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a vehicle constructed in accordance with the present invention;

FIGURE 2 is a fragmentary enlarged sectional view taken substantially upon a plane passing through the center of a dual wheel form of vehicle wheel constructed in accordance with the present invention;

FIGURE 3 is a fragmentary side elevational view of a cylindrical spacer utilized in the dual wheel form of the invention between the generally cylindrical outer rim portions thereof; and FIGURE 4 is an enlarged fragmentary sectional view similar to that of FIGURE 2 but illustrating the structural details and manner of assembly of a single wheel form of the invention.

Referring now more specifically to the drawings, the numeral 10 generally designates a dual wheel form of the wheel construction of the instant invention. The wheel construction 10 includes a body portion referred to in general by the reference numeral 12 composed of a central or hub portion adapted to be secured to a wheel hub and a plurality of circumferentially spaced and radially outwardly projecting arms or spokes 16. The outer ends of the arms lie on circumferentially spaced portions of the same circle having the center of the body portion 12 as its center of curvature and the wheel construction 10 may also be seen to include a pair of generally cylindrical and identical outer rim members 19, see FIGURE 2. The rim members 18 are secured to the body 12 in a manner to be hereinafter more fully set forth in position reversed relative to each other and each of the rim members 19 includes a plurality of circumferentially spaced and radially inwardly projecting first mounting lug abutment members 18. In addition, the outer ends of the arms 16 include a plurality of radially outwardly projecting second mounting lug abutment members 20 disposed on one side of the body 12. The rim members 19 snugly receive the radial outermost portions of the abutment members 20 therein and each of the arms 16, which are hollow, includes a fastener 22 secured through a portion thereof and utilized to removably secure a plurality of circumferentially spaced third mounting lug abutment members 24 to the arms 16. The radial outermost extremities of the abutment members 24 are also snugly receivable within the rim members 19 and a generally cylindrical spacer 26 is disposed between corresponding abutment members 18 with the remote sides of corresponding pairs of the abutment members 18 being clampingly received between the abutment members 20 comprising integral portions of the arms 16 and the abutment members 24 removably secured to the arms 16.

The abutment members 20 and 24 include generally wedge-shaped recesses 28 and 30, respectively, which open toward each other and opposite end portions of the cylindrical spacer include oppositely opening recesses 32 and 34 which open toward the recesses 28 and 38, respectively.

The abutment members 18 include projections 36 projecting in opposite directions with the projections 36 on the lefthand rim member 19 viewed in FIGURE 2 of the drawings being received in the recesses 30 and 34 and the projections 36 carried by the righthand rim 19 being received in the recesses 28 and 32. It will, of course, be noted that the interfitting of the projections 36 within the recesses 28, 30, 32 and 34 prevents radial displacement of the rim members 19 as well as the spacer 26 relative to the body 12. However, the spacer 26 includes a plurality of shallow generally U-shaped leaf springs 40 secured to its inner peripheral surface at points spaced circumferentially thereabout and which engage the radial outermost surfaces of the arms 16 disposed between the abutment members 20 and 24 in order that the spacer 26 will be biased toward a position precisely concentric with the center of the body 12.

Each of the rim members 19 includes a fixed radially outwardly projecting tire bead retaining flange 42 on its end remote from the abutment members 18 and a removable split tire bead retaining flange 44 which is seatingly receivable in a circumferential groove 46 provided therefor in the corresponding rim member 19.

Of course, before the rim members 19 are mounted on the body 12, the tire casings 48 are mounted on the rim portions 19 and secured thereon by means of the split retaining flanges 44. Thereafter, the rim members 19 and the spacer 26 may be secured to the outer end portions of the arms 16 by means of the removable abutment members 24.

The recesses 28, 30, 32 and 34 are each V-shaped in cross-section and the projections 36 are wedged-shaped in cross-section except that their apex end portions have been eliminated thereby making the projections truncated at their minor dimensioned ends.

With attention now directed more specifically to FIGURE 4 of the drawings, there may be seen a modified form of wheel construction generally referred to by the reference numeral 10' and which includes a body generally referred to by the reference numeral 12' and similar to the body 12 in that it includes radially outwardly projecting arms 16', the latter not being hollow.

A fastener 22' and corresponding to the fasteners 22 is threadedly engaged in a bore 23 provided therefor in each of the outer end portions of the arms 16' and each of the latter includes an abutment member 20' corresponding to the abutment members 20. Removable abutment members 24' corresponding to the abutment members 24 are also provided and removably secured to the fasteners 22' by means of suitable nuts 25 and the abutment members 20' and 24' include recesses 28' and 30' corresponding to the recesses 20 and 30.

The wheel construction 10' includes a rim member 19' which is a substantial duplicate of the rim members 19 and which includes a plurality of circumferentially spaced abutment members 18' corresponding to the abutment members 18. The opposite end projections 36' of the abutment members 18' are seatingly received in the recesses 28' and 30'.

The wheel constructions 10 and 10' may be readily handled and have the tire casings 48 and 48' readily removed therefrom. Of course, removal of the tire casings 48 and 48' necessitate removal of the split flanges 44 and 44'. After the split flange 44' has been removed, the tire casing 48' may be readily removed from the rim member 19'. However, when it is desired to remove the tire casings 48, it is also necessary to remove the rim members 19 from the body 12, or at least the rim member 19 encircling the abutment members 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a wheel body including opposite sides and circumferentially spaced outer peripheral portions, generally cylindrical outer rim means adapted to have tire casing means mounted thereon, said outer rim means including first circumferentially spaced and radially inwardly projecting mounting lug abutment means, said outer peripheral portions including second circumferentially spaced and radially outwardly projecting second mounting lug abutment means snugly receivable within said outer rim means and registrable with said first abutment means for abutting engagement therewith upon relative axial shifting of said body and rim means, and third circumferentially spaced and radially outwardly projecting mounting lug abutment means removably secured to said outer peripheral portions registered with the sides of said first abutment means axially opposite from said second abutment means and adjustable axially of said body toward said second abutment means for clampingly securing said first abutment means between the corresponding second and third abutment means, said second and third abutment means defining opposing abutment surface portions facing generally axially of said wheel body and each reversed front to rear relative to the other and otherwise substantially identical in configuration, said first abutment means defining oppositely facing abutment surface portions opposing and complementary to said reversed abutment surface portions, said oppositely facing abutment surface portions being reversed front to rear relative to each other and substantially identical in configuration, whereby said rim means may be selectively reversed on said wheel body, the opposing faces of said first, second and third abutment means including axially and radially overlapping portions operative to prevent relative radial shifting between said rim means and said wheel body.

2. The combination of claim 1 wherein said rim means comprises a single rim member adapted to have a single tire casing removably supported therefrom.

3. The combination of claim 1 wherein said rim means comprises a pair of axially spaced rim members each adapted to have a tire casing removably supported therefrom and including circumferentially spaced and axially aligned radially inwardly projecting abutment members together comprising said first abutment means, and spacer means disposed between corresponding pairs of abutment members of said axially spaced rim members, said abutment members each including said oppositely facing abutment surface portions and said spacer means including oppositely facing abutment surface portions similar to said opposing abutment surface portions.

4. The combination of claim 3 wherein said spacer means comprises a continuous ring member passing about and spaced slightly radially outwardly of the radially outermost surfaces, said outer peripheral portions disposed between said second and third abutment means.

5. The combination of claim 4 including spring means operatively connected between said ring member and outer peripheral portions biasing said ring member toward a position concentric with said wheel body.

6. The combination of claim 5 wherein said radially outermost surfaces are substantially axially straight and said spring means comprises leaf spring means spaced circumferentially about and extending generally axially of said ring member and having at least one set of corresponding ends secured to the inner surfaces of said ring member and including cam surfaces engageable by said outer peripheral portions to bias said spring means during axial shifting of said ring member toward said outer peripheral portions to initially position said ring member in radial alignment with said outer peripheral portions.

7. The combination of claim 1 wherein said wheel body defines a central portion adapted to be secured to a wheel hub and a plurality of generally radially outwardly projecting arms spaced circumferentially about said central portion, said circumferentially spaced outer peripheral portions comprising the radially outermost end portions of said arms.

8. The combination of claim 7 wherein said rim means comprises a single rim member adapted to have a single tire casing removably supported therefrom.

References Cited

UNITED STATES PATENTS

| 1,869,635 | 8/1932 | Walther. |
| 2,209,030 | 7/1940 | MacDonald. |
| 2,133,481 | 11/1938 | Brink _____ 301—12 X |

FOREIGN PATENTS

| 250,264 | 9/1926 | Great Britain. |
| 566,815 | 12/1958 | Canada. |
| 691,292 | 7/1930 | France. |
| 345,549 | 5/1960 | Switzerland. |

RICHARD J. JOHNSON, *Primary Examiner.*